(12) United States Patent
Recker et al.

(10) Patent No.: US 7,185,914 B2
(45) Date of Patent: Mar. 6, 2007

(54) INFLATABLE CURTAIN WITH PLEATS

(75) Inventors: James L. Recker, North Ogden, UT (US); Kurt Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 244 days.

(21) Appl. No.: 10/669,807

(22) Filed: Sep. 24, 2003

(65) Prior Publication Data

US 2005/0062267 A1   Mar. 24, 2005

(51) Int. Cl.
*B60R 21/213* (2006.01)
*B60R 21/237* (2006.01)

(52) U.S. Cl. .................................. 280/730.2
(58) Field of Classification Search ............. 280/730.2, 280/743.1
See application file for complete search history.

(56) References Cited

U.S. PATENT DOCUMENTS

| | | | |
|---|---|---|---|
| 5,162,035 A | 11/1992 | Baker | |
| 5,240,282 A | 8/1993 | Wehner et al. | |
| 5,275,435 A | * 1/1994 | Fischer | 280/743.1 |
| 5,362,101 A | * 11/1994 | Sugiura et al. | 280/743.2 |
| 5,531,477 A | 7/1996 | Madrigal et al. | |
| 5,568,938 A | * 10/1996 | Lindstrom | 280/743.2 |
| 5,746,690 A | 5/1998 | Humbarger et al. | |
| 5,775,733 A | 7/1998 | Lunt et al. | |
| 5,865,465 A | 2/1999 | Bauer et al. | |
| 5,921,575 A | 7/1999 | Kretschmer et al. | |
| 5,944,346 A | 8/1999 | Lachat et al. | |
| 5,992,882 A | * 11/1999 | Ito et al. | 280/743.1 |
| 6,000,715 A | 12/1999 | Tschaeschke | |
| 6,073,961 A | 6/2000 | Bailey et al. | |
| 6,079,732 A | 6/2000 | Nakajima et al. | |
| 6,102,435 A | 8/2000 | Wallner et al. | |
| 6,110,094 A | 8/2000 | Wallentin et al. | |
| 6,152,481 A | 11/2000 | Webber et al. | |
| 6,179,323 B1 | 1/2001 | Shellabarger et al. | |
| 6,231,070 B1 | 5/2001 | Sunabashiri et al. | |
| 6,237,943 B1 | 5/2001 | Brown et al. | |
| 6,257,616 B1 | 7/2001 | Nowak et al. | |
| 6,264,234 B1 | 7/2001 | Hill et al. | |
| 6,293,581 B1 | 9/2001 | Saita et al. | |

(Continued)

FOREIGN PATENT DOCUMENTS

DE    196 53 796    12/1996

*Primary Examiner*—Paul N. Dickson
*Assistant Examiner*—Laura B. Rosenberg
(74) *Attorney, Agent, or Firm*—Sally J Brown; Madson & Austin (57) ABSTRACT

An inflatable curtain is provided that may be mounted on or proximate to a vehicle's side roof rail. The inflatable curtain includes a first panel and a second panel that is attached to the first panel. The first panel and the second panel are generally made of fabric materials such as nylon and the like. At least one first pleat is added to the first panel. The first pleat is constructed such that when the inflatable curtain is inflated with inflation gas, the first pleat opens into at least one first bulge that changes the deployment trajectory of the inflatable curtain. At least one second pleat may additionally be added to the curtain. The second pleat is added to the second panel and is designed such that during inflation, the second pleat will open into a second bulge that further changes the deployment trajectory of the inflatable curtain.

33 Claims, 6 Drawing Sheets

U.S. PATENT DOCUMENTS

| | | |
|---|---|---|
| 6,305,707 B1 | 10/2001 | Ishiyama et al. |
| 6,336,651 B1 | 1/2002 | Mramor et al. |
| 6,371,512 B1 * | 4/2002 | Asano et al. ............ 280/730.2 |
| 6,412,810 B1 | 7/2002 | Wipasuramonton et al. |
| 6,425,601 B1 | 7/2002 | Lewis |
| 6,447,005 B2 | 9/2002 | Alb et al. |
| 6,454,298 B1 | 9/2002 | Hardig et al. |
| 6,460,878 B2 * | 10/2002 | Eckert et al. ............ 280/730.1 |
| 6,464,251 B1 * | 10/2002 | Volkmann et al. ....... 280/730.2 |
| 6,499,765 B2 * | 12/2002 | Hawthorn et al. ....... 280/743.1 |
| 6,736,422 B2 * | 5/2004 | Nakanishi ................. 280/730.2 |
| 6,736,424 B2 * | 5/2004 | Specht et al. ................ 280/735 |
| 6,739,622 B2 * | 5/2004 | Halford et al. .......... 280/743.1 |
| 6,758,490 B2 * | 7/2004 | Hoeft et al. ............. 280/730.2 |
| 6,851,707 B2 * | 2/2005 | Bakhsh et al. ........... 280/730.2 |
| 6,869,099 B2 * | 3/2005 | Kawasaki et al. ....... 280/730.2 |
| 6,955,377 B2 * | 10/2005 | Cooper et al. ........... 280/743.1 |
| 2003/0116947 A1 * | 6/2003 | Yokoyama et al. ...... 280/730.2 |
| 2003/0197358 A1 * | 10/2003 | Hawthorn et al. ....... 280/743.1 |
| 2004/0017067 A1 * | 1/2004 | Daines et al. ............. 280/730.2 |
| 2004/0075257 A1 * | 4/2004 | Ogawa et al. ............ 280/730.2 |
| 2004/0100074 A1 * | 5/2004 | Bakhsh et al. ........... 280/730.1 |
| 2004/0164530 A1 * | 8/2004 | Sunabashiri ............. 280/730.2 |
| 2004/0256841 A1 * | 12/2004 | Bakhsh et al. ........... 280/730.1 |

* cited by examiner

INFLATABLE CURTAIN WITH PLEATS

BACKGROUND OF THE INVENTION

1. Field of the Invention

The present invention relates to inflatable curtain airbags. More specifically, the present invention relates to a novel inflatable curtain airbag having one or more pleats that may be installed on or proximate to a vehicle's side roof rail.

2. Description of Related Art

Inflatable airbags enjoy widespread acceptance as passive passenger restraints for use in motor vehicles. This acceptance has come as airbags have built a reputation of preventing death and injury over years of use. Studies show that in some instances, the use of frontally-placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

Airbags are generally linked to a control system within the vehicle that triggers their initiation when a collision occurs. Generally, an accelerometer within the vehicle measures the abnormal deceleration caused by the collision event and triggers the ignition of an airbag inflator. This control system is often referred to as an electronic control unit (or "ECU"). The ECU includes a sensor that continuously monitors the acceleration and deceleration of the vehicle and sends this information to a processor that uses an algorithm to determine whether a deceleration experienced by the vehicle is a caused by a collision or accident. Additional sensors may be linked to the ECU to allow the proper detection of side-impact collisions, rollovers, etc.

When the processor of the ECU determines, based on a set of pre-determined criteria, that the vehicle is experiencing a collision, the ECU transmits an electrical current to an initiator assembly connected to an inflator that is coupled to the airbag module. The initiator activates the inflator. An inflator is a gas generator that typically uses a compressed or liquefied gas or mixture of gases, a solid fuel, or some combination of the above to rapidly generate a volume of inflation gas. The gas inflates the airbag, which deploys into the path of the vehicle occupant and absorbs the impact of the vehicle occupant.

Recently, airbag technology has continued to advance such that inflatable curtain airbags are now enlisted to provide roll-over protection as well as side impact protection. During a roll-over accident, the vehicle occupants can be jostled considerably, thereby causing the occupant to impact various parts of the vehicle interior. Even worse, the occupant may be ejected from the vehicle. Alternatively, a head or limb of an occupant may extend outside the vehicle during the roll-over. Such "occupant excursion" during roll-over accidents is a common cause of automotive fatality, particularly in the case of vehicle occupants that are not wearing a seat belt during the roll-over.

Conventional curtain airbags attempt to combat the dangers of side impact or roll-over accidents by having a curtain airbag unroll or unfold downward from the roof of the vehicle and then inflate beside the person as a means of preventing the person from hitting the door, window, or lateral side of the vehicle. Since a vehicle occupant may be leaning forward, reclined in the seat, or at any position in between, such curtain airbags are usually designed to be long enough to cover the whole interior side of the vehicle, protecting occupants in both front and rear passenger compartments.

Generally, the inflatable curtain airbag must be sized to hold large volumes of inflation gas and to descend below the window sill. Consequently, when not inflated the curtain airbag includes a significant amount of material. This material is then rolled, folded, or otherwise gathered to form a tight, tubular bundle. A wrapper (sometimes called a "sock") that fits around the curtain is then added to ensure that the curtain airbag is kept rolled or folded.

The curtain is stored and mounted either on or proximate a roof rail of the vehicle. Such mounting is generally accomplished via a two-step process. First, the curtain must be held in the proper position. This can be done by either having multiple workers hold the airbag or by attaching the airbag to sophisticated jigs, hooks, or mounting brackets (collectively "brackets") that have been placed into slots in the body of the vehicle. Once the curtain airbag has been secured in the proper location, the workers are free to affix the curtain airbag assembly to the vehicle using fasteners such as bolts, screws, rivets, and the like. Usually these fasteners are threaded into one or more attachment tabs that have been added along the top of the curtain airbag to facilitate the assembly and mounting process.

While currently known inflatable curtain systems have provided a significant improvement in the art, problems and drawbacks still exist that limit the ability of vehicle and airbag manufacturers to implement and use inflatable curtains on all motor vehicles. For example, many curtain airbags are designed such that as curtain deploys into the inflated configuration, the curtain will impact and/or be impeded by the vehicle's structure, trim panel, wiring, and/or other vehicle components. Such impact during deployment is extremely detrimental in that it increases the deployment time and/or prevents the curtain from becoming situated in an undesired position. As a result, the ability and effectiveness of the inflatable curtain to adequately protect a vehicle occupant during a crash is greatly reduced.

In order to avoid the problems associated with the curtain impacting the vehicle during deployment, vehicle and airbag manufacturers often add features such as pillar ramps, shape maintainers, folds, wrappers, or trim pieces (collectively "ramps") are added to the inflatable curtain assembly. The ramps are designed to change the deployment trajectory of the inflatable curtain. As used herein, "deployment trajectory" is the path, course, or angle undertaken by the inflatable curtain as it is inflated and deployed within the vehicle. Preferably, the ramps change the deployment trajectory of the inflatable curtain such that the deployment of the curtain is not impacted or impeded by the trim panel or other interior portions of the vehicle.

Unfortunately however, the use of such ramps can significantly increase the total costs associated with producing, assembling, and installing the inflatable curtain airbag system for airbag manufacturers. Ramps increase the total number components required to produce the inflatable curtain system. As a result, airbag manufacturers are forced to expend additional resources to produce, design, and/or install the inflatable curtain. Perhaps more importantly, known ramps are often small components that are difficult to handle and use, and as such, airbag installers must expend additional seconds and/or minutes in order to properly position and install the ramps. As manufacturers incur costs for every moment that passes during the assembly process, even an increase of a few seconds or minutes in the assembly time represents a significant impact on the manufacturer's total production costs and overall profit margin of a mass-produced vehicle.

Moreover, the addition of ramps to the inflatable curtain system is undesirable in that the ramps will occupy valuable space proximate to the roof rail. Besides the inflatable curtain, various other vehicle components need to be installed proximate to the roof rail. Examples of such components include hand grips, lighting fixtures, sun or moon roof brackets, drain tubes, wiring, and heating and ventilation (HVAC) controls and ducts. In smaller or compact vehicles where space is at a premium, the addition of the ramps to the inflatable curtain system may take up and/or interfere with the space necessary to properly install these other vehicle components.

Accordingly, there is a need in the art for a novel inflatable curtain that addresses and/or solves one or more of the above-listed problems. Such a device is disclosed herein.

SUMMARY OF THE INVENTION

The apparatus of the present invention has been developed in response to the present state of the art, and in particular, in response to the problems and needs in the art that have not yet been fully solved by currently available inflatable curtain airbag assemblies. Thus, the present invention provides an inflatable curtain that may be positioned onto a vehicle interior on or proximate to a side roof rail.

Generally, the inflatable curtain comprises a first panel and a second panel that are made of fabric or other similar materials. A first pleat is also added to the first panel. Preferably, the first pleat is added to the first panel by folding or otherwise arranging the first panel such that a portion of the fabric material of the first panel is doubled back upon itself.

After the first pleat has been added to the first panel, the second panel is permanently attached to the second panel. Such attachment may preferably be accomplished by sewing or stitching the second panel to the first panel. However, other mechanisms or methods for attaching the second panel to the first panel may also be used including adhesive bonding, gluing, welding, and the like.

Once the second panel has been attached to the first panel, the inflatable curtain may then be rolled, folded, or otherwise gathered into a tubular bundle and installed on or proximate to the vehicle's side roof rail. A headliner and/or decorative trim panel is usually also added to cover the inflatable curtain and increase the aesthetic attractiveness of the vehicle interior.

The inflatable curtain may also be attached to an inflator and an electronic control unit ("ECU"). In the event that a crash or accident occurs, the ECU signals the inflator and causes the inflator to produce and/or channel a volume of inflation gas into the curtain. This influx of inflation gas inflates the curtain. As the curtain inflates, the curtain pushes and/or moves the headliner away from the trim panel such that the inflating curtain may descend and cover all or a portion of the side of the vehicle interior.

The inflation gas entering the curtain fills the first pleat such that the first pleat opens into at least one first bulge. The first bulge changes the deployment trajectory of the inflatable curtain. More specifically, most previously known inflatable curtains have a deployment trajectory set such that these curtain will impact the trim panel as they are being inflated and deployed. Unlike these previously known curtains however, the curtains of the present invention are constructed such that when they are deployed and inflated, the first bulge interacts with the roof rail, the trim panel, and/or other portions of the vehicle interior. This interaction changes the deployment trajectory and allows the curtains of the present invention to clear the trim panel and/or other portions of the vehicle interior during deployment.

Further embodiments of the present invention may be made in which the inflatable curtain additionally comprises a second pleat. More than one second pleat may also be used. The second pleat is added to the second panel. As with the first pleat, the second pleat is preferably formed by folding or otherwise arranging the second panel such that at portion of the fabric material of the second panel is doubled back upon itself.

The second pleat is preferably constructed such that when the curtain is inflated, the second pleat opens into at least one second bulge. As with the embodiments described above, the second bulge interacts with portions of the vehicle interior and changes the deployment trajectory of the inflating curtain. Preferably, the second bulge interacts with the vehicle interior such that the deploying curtain will clear the trim panel.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8J, is not intended to limit the scope of the invention, as claimed, but is merely representative of presently preferred embodiments of the invention.

Figure 1:
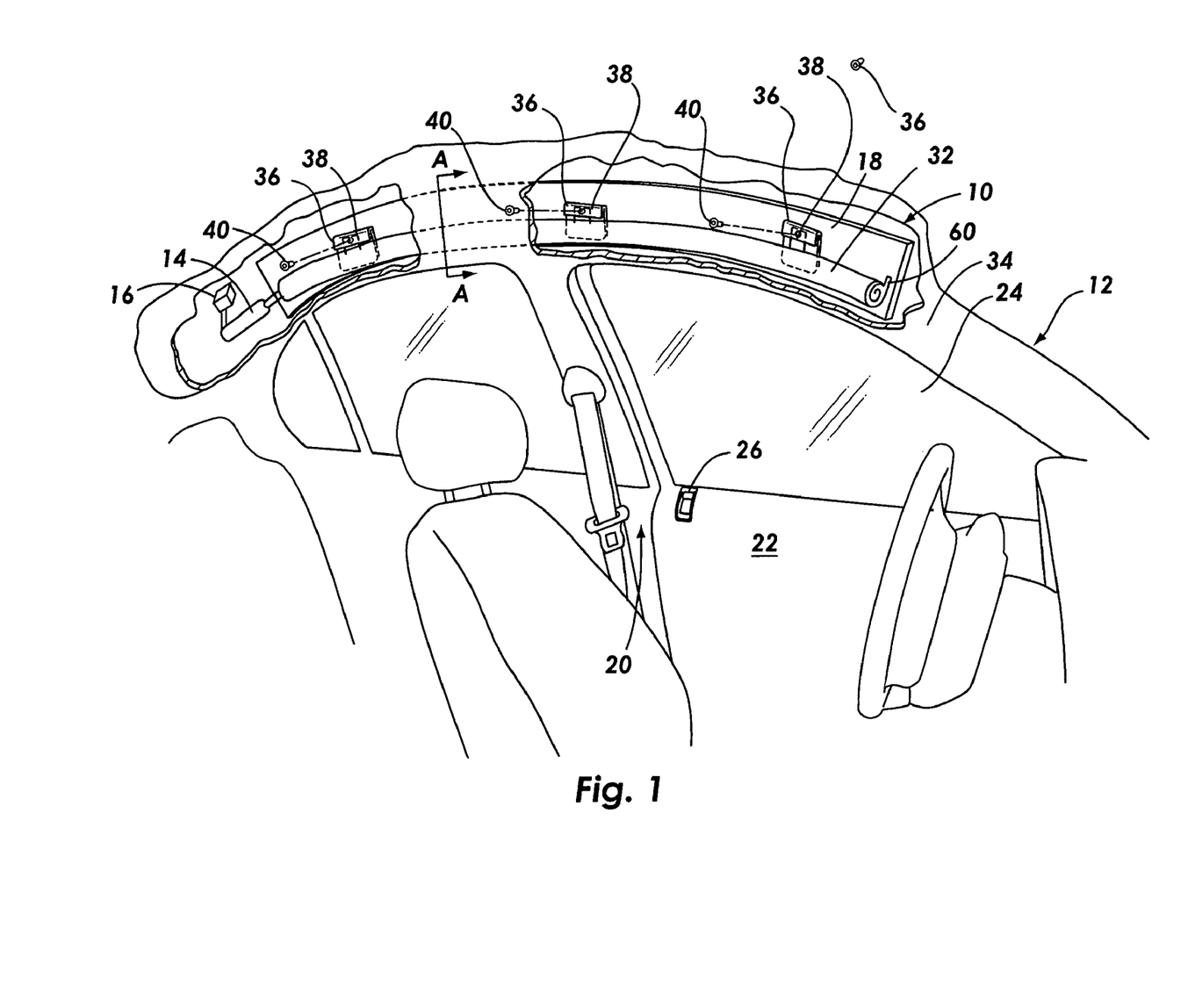
FIG. 1 is partially cutaway perspective view of a vehicle interior in which an inflatable curtain according to the present invention has been attached to the vehicle's side roof rail.

Referring to FIG. 1, an inflatable curtain 10 according to the present invention is illustrated attached to a vehicle interior 12. The inflatable curtain 10 is attached to an inflator 14 that is capable of producing or channeling large volumes of inflation gas into the inflatable curtain 10 during a crash or accident. An ECU 16 that provides an initiation signal to initiate the inflation of the inflatable curtain 10 when an accident occurs may also be added.

Generally, the inflatable curtain 10 is stored on or proximate a side roof rail 18 of the vehicle. The curtain 10 is designed to inflate and substantially cover the lateral side 20, the window 24, and may partially cover portions of the door 22 when an accident occurs. Because the size of the roof rail 18 is generally kept to a minimum to provide an aesthetic vehicle interior and to accommodate larger windows, the inflatable curtain 10 is usually rolled, folded, or otherwise gathered into a bundle having dimensions similar to those of the roof rail 18 before installation on the vehicle interior 12.

As the roof rail 18 and the inflatable curtain 10 are often not visually appealing to the customer, a vehicle headliner 32 and/or decorative trim 34 are usually added to increase the aesthetic attractiveness of the vehicle interior 12. The headliner 32 is generally added to cover the roof of the vehicle while the edges of the headliner 32 descend to mask the area inboard of the roof rail 18. If the design of the vehicle interior 12 is such that the roof rail 18 is not completely covered by the headliner 32, the decorative trim 34 may be used to further cover the roof rail 18.

Generally, the inflatable curtain 10 is attached to the vehicle interior 12 to ensure that the curtain 10 maintains a preferred position and orientation during deployment as well as during the normal operation of the vehicle. Thus, one or more mounting brackets 36 and/or one or more attachment tabs 38 may be added to anchor the inflatable curtain 10 to the vehicle interior 12. Preferably, the mounting brackets 36 engage and hold a portion of the attachment tabs 38 such that one or more fasteners 40 may then be added to permanently mount the inflatable curtain 10 to the vehicle interior 12.

The inflatable curtain 10 further comprises a first pleat 60. More that one first pleat 60 may also be used. The first pleat 60 may spans the length of the curtain 10 and may be positioned proximate to the roof rail 18. The first pleat 60 is constructed such that when the curtain 10 is inflated, the first pleat 60 opens into a first bulge (not shown in FIG. 1) that changes the deployment trajectory of the inflatable curtain 10.

Figure 2:
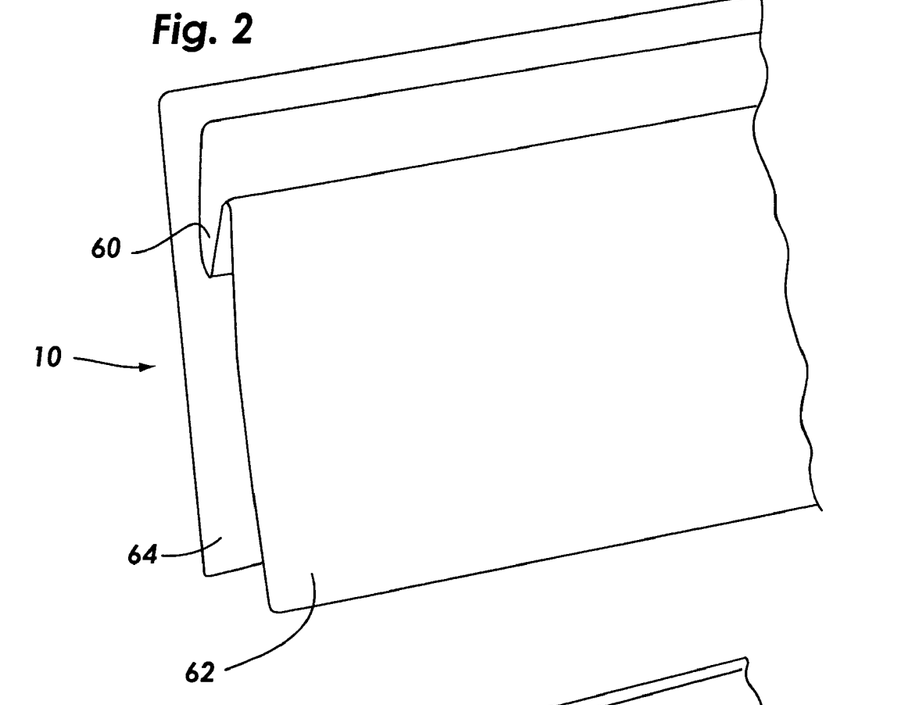
FIG. 2 is side plan view of the first and second panels that are used to construct the inflatable curtain shown in FIG. 1.
Figure 3:
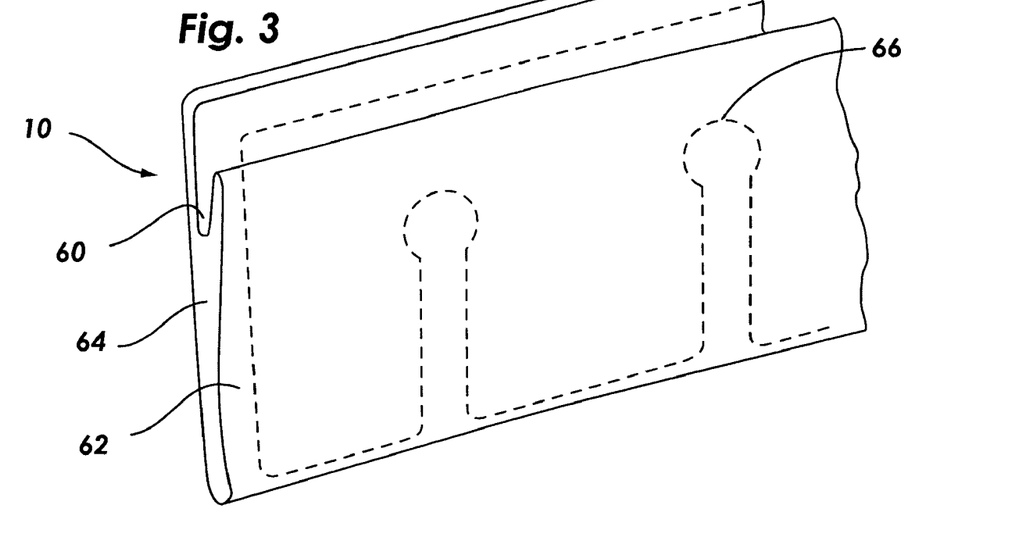
FIG. 3 is side plan view of the inflatable curtain illustrated in FIG. 2 in which the first and second panels have been connected together via sewing.

Referring now to FIGS. 2 and 3, the manner by which the at least one first pleat 60 may be added to the inflatable curtain 10 may be made is illustrated in greater detail. The inflatable curtain 10 comprises a first panel 62 and a second panel 64. The first panel 62 and the second panel 64 are made of fabric such as nylon and the like. As depicted in FIG. 2, the first pleat 60 is added to the first panel 62 by folding or otherwise arranging the first panel 62 such that a portion of the fabric material of the first panel 62 is doubled back upon itself. Preferably, the first pleat 60 spans the length of the first panel 60. Of course, other embodiments may also be made in which the first pleat 60 spans a portion of the length of the first panel 62.

As can be seen in FIG. 3, once the first pleat 60 has been added to the first panel 62, the second panel 64 is then attached to the first panel 62. Such attachment is preferably accomplished by sewing or stitching the second panel 64 to the first panel 62 along sew line 66. However, other mechanisms or methods for attaching the second panel 64 to the first panel 62 may also be used including adhesive bonding, gluing, welding, and the like. Once the second panel 62 has been attached to the first panel 64, the inflatable curtain 10 may then be rolled, folded, or otherwise gathered into a tubular bundle and installed onto a vehicle interior in the manner described above.

Figure 4:
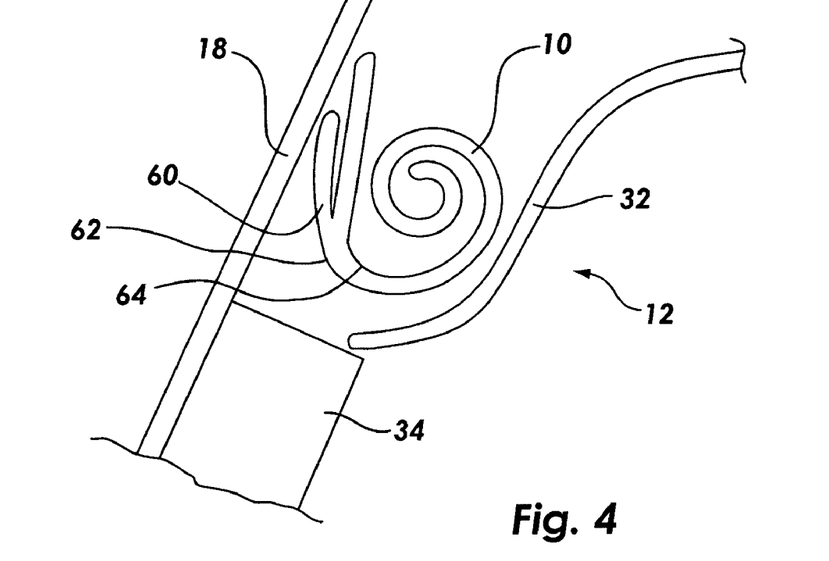
FIG. 4 is a cross-sectional view of the vehicle interior and the inflatable curtain taken along the line A—A of FIG. 1.

Referring now to FIG. 4, a cross-sectional view taken along the line A—A of FIG. 1 illustrates the inflatable curtain 10 in greater detail. More specifically, FIG. 4 shows an embodiment of the invention in which the curtain 10 has been rolled into a tubular bundle and attached to the roof rail 18 above the trim panel 34. All or a portion of the headliner 32 is then used to cover the curtain 10 and make the vehicle interior 12 more visually appealing.

In the embodiment shown in FIG. 4, the curtain 10 has been mounted to the vehicle interior 12 such that the first pleat 60 is positioned adjacent to the roof rail 18. Of course, those of skill in the art will recognize that other embodiments may also be made in which the first pleat 60 is positioned away from and/or opposite the roof rail 18. Yet further embodiments may have the first pleat 60 positioned adjacent to the headliner 32 and/or the trim panel 34.

Figure 5:
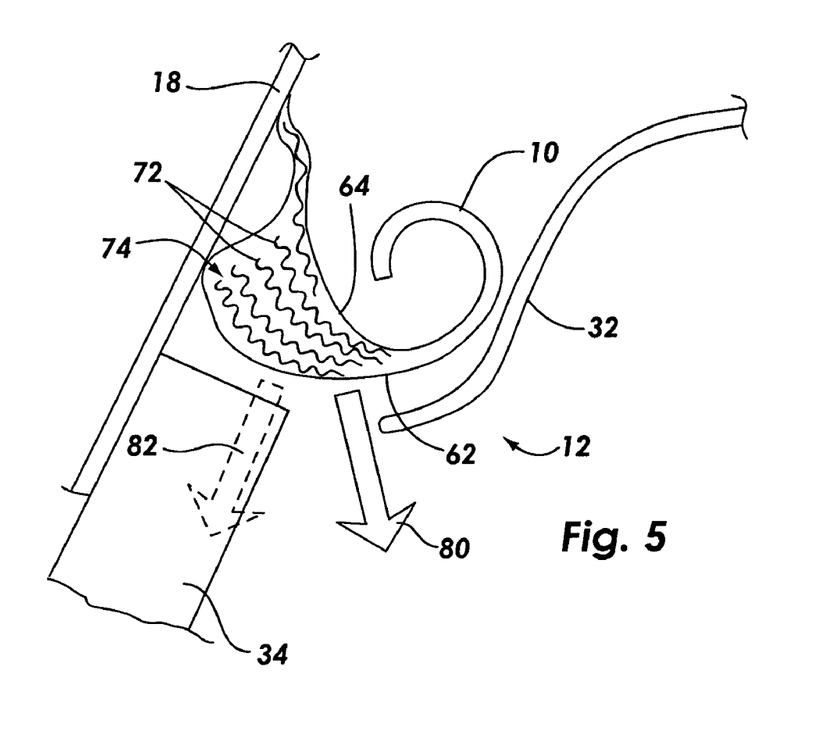
FIG. 5 is a cross-sectional view of the vehicle interior and the inflatable curtain of FIG. 4 that illustrates the way in which the inflatable curtain may be inflated and deployed during a crash or accident.

FIG. 5 is a cross-sectional view similar to the view shown in FIG. 4 that illustrates the way in which the curtain 10 inflates during a crash or accident. More specifically, when a crash or accident occurs, the ECU 16 (shown in FIG. 1) signals the inflator 14 (shown in FIG. 1) such that the inflator 14 produces and/or channels a volume of inflation gas 72 into the curtain 10. In turn, this influx of inflation gas 72 inflates the curtain 10. As the curtain 10 inflates, the curtain 10 pushes and/or moves the headliner 32 away from the trim panel 34 such that the inflating curtain 10 may descend and cover all or a portion of the side of the vehicle interior 12.

The injection of the inflation gas 72 fills the first pleat 60 (shown in FIG. 4) such that the first pleat opens into at least one first bulge 74. The first bulge 74 changes the deployment trajectory 80 (represented graphically by an arrow) of the inflatable curtain 10.

As can be seen in FIG. 5, previously known inflatable curtains have a deployment trajectory 82 (represented graphically by an arrow in phantom lines) that is set such that the deployment of these curtains will impact the trim panel 34 and/or other portions of the vehicle interior 12 when they are inflated and deployed. However, when the curtain 10 of the present invention is inflated and deployed, the first bulge 74 interacts with the roof rail 18, the trim panel 34, and/or other portions of the vehicle interior 12. This interaction with the vehicle interior 12 changes the deployment trajectory 80 of the curtain 10. More specifically, this interaction with the vehicle interior 12 changes the deployment trajectory 80 of the curtain 10 such that the deploying curtain 10 will clear the trim panel 34.

Figure 6:
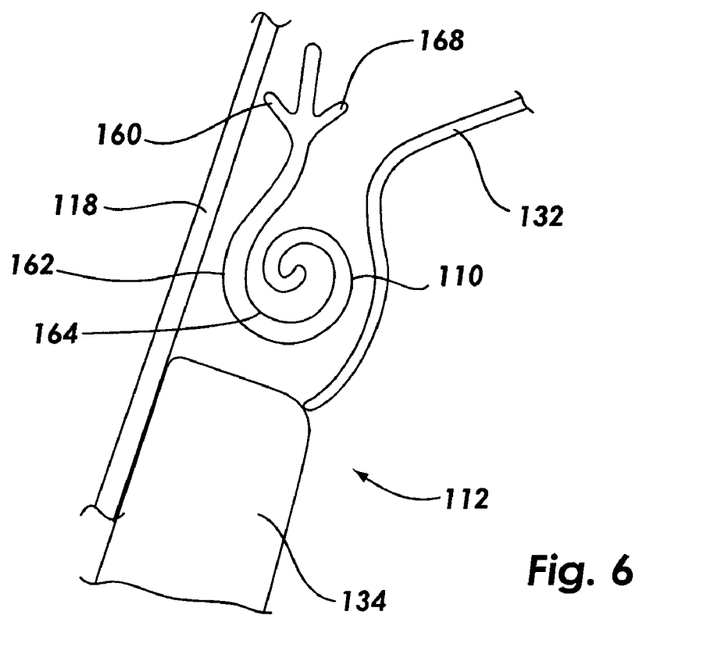
FIG. 6 is a cross-sectional view of a vehicle interior including an additional embodiment of the inflatable curtain of the present invention.

Referring now to FIG. 6, a cross-sectional view of a further embodiment of the present invention is illustrated. More specifically, FIG. 6 is a cross-sectional view similar to the view shown in FIGS. 4 and 5 that illustrates an inflatable curtain 110 of the present invention that has been attached or mounted to a vehicle interior 112. As can be seen in FIG. 6, most of the components and elements of the inflatable curtain 110 and the vehicle interior 112 are similar and/or equivalent to the components and elements that are found in the embodiment described above.

In the embodiment shown in FIG. 6, the inflatable curtain 110 has been rolled into a tubular bundle and has been attached to the roof rail 118 above a trim panel 134. All or a portion of a headliner 132 is then added to cover the inflatable curtain 110 and make the vehicle interior 112 more visually appealing.

The inflatable curtain 110 comprises a first panel 162 and a second panel 164. The first panel 162 and the second panel 164 are made of fabric such as nylon and the like and are constructed such that the second panel 164 is attached to the first panel 162. As described above, this attachment is preferably accomplished by sewing the second panel 164 to the first panel 162. Of course, other methods for attaching the second panel 164 to the first panel 162, such as adhesive bonding, gluing, welding, and the like, may also be used.

The inflatable curtain 110 further comprises a first pleat 160 that is added to the first panel 162. More than one first pleat 160 may also be added. The first pleat 160 is formed by folding or otherwise arranging the first panel 162 such that a portion of the fabric material of the first panel 162 is doubled back upon itself. In some embodiments, the first pleat 160 may span the length of the first panel 162. Of course, other embodiments may also be made in which the first pleat 160 spans a portion of the length of the first panel 162.

A second pleat 168 may also be added to the second panel 164. More than one second pleat 168 may also be used. As with the first pleat 160, the second pleat 168 is formed by folding or otherwise arranging the second panel 164 such that a portion of the fabric material of the second panel 164 is doubled back upon itself. In some embodiments, the second pleat 168 may span the length of the second panel 164. Of course, other embodiments may also be made in which the second pleat 168 spans a portion of the length of the first panel 164.

In the embodiment shown in FIG. 6, the first pleat 160 and the second pleat 168 span the length of the curtain 110. Additionally, the pleats 160, 168 are aligned together and positioned such that the first pleat 160 is adjacent to the roof rail 118 and the second pleat is adjacent to the headliner 132. Of course, those of skill in the art will recognize that other embodiments may also be made in which the position or configuration of the first pleat 160 and/or the second pleat 168 differs from that which is shown in FIG. 6. For example, embodiments may be made in which the first pleat 160 is offset from the second pleat 168. Further embodiments may also be made in which the first pleat 160 and/or the second pleat 168 is located proximate to the headliner 132, the roof rail 118, and/or the trim panel 134.

Figure 7:
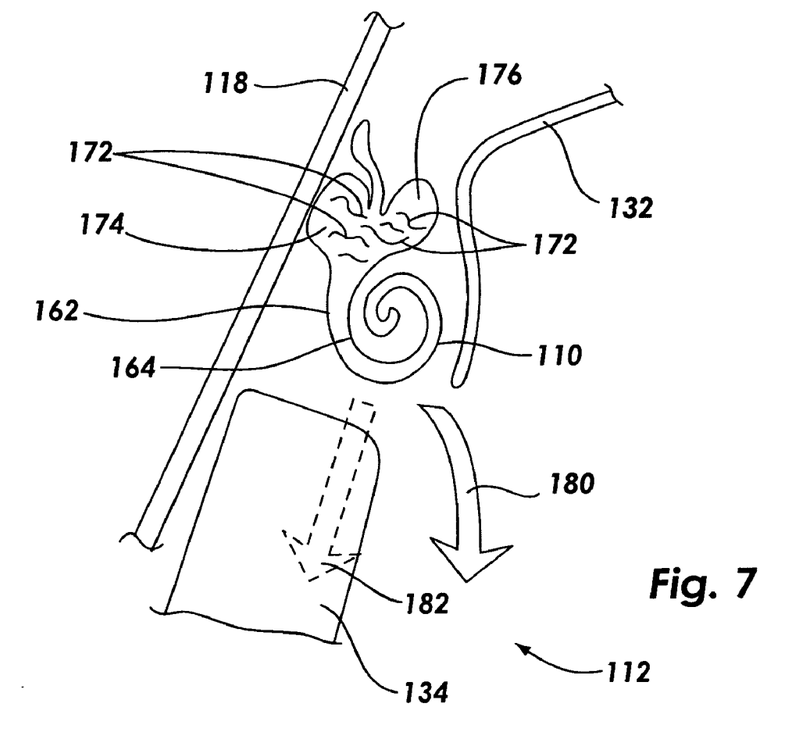
FIG. 7 is a cross-sectional view of the vehicle interior and the inflatable curtain of FIG. 6 that illustrates the way in which this embodiment of the inflatable curtain may be inflated and deployed during a crash or accident.
Figure 8A:
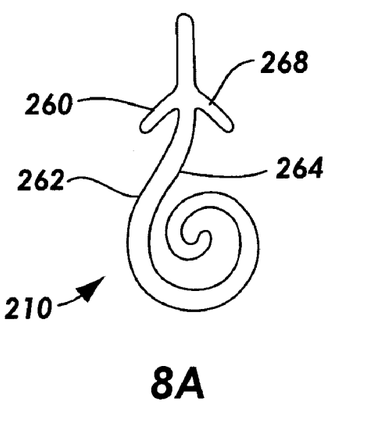
FIGS. 8A–8J are cross-sectional views of yet further embodiments of the inflatable curtain according to the present invention.
Figure 8B:
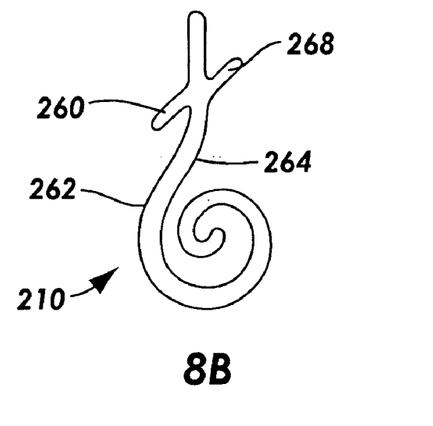
Figure 8C:
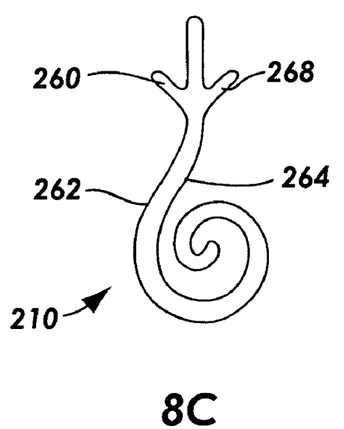
Figure 8D:
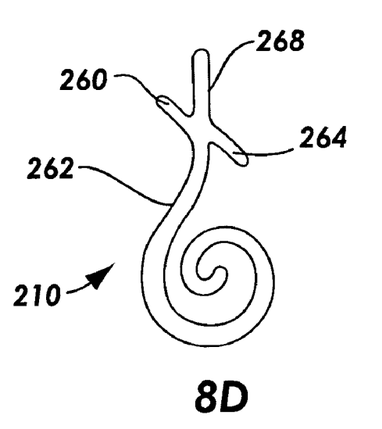
Figure 8E:
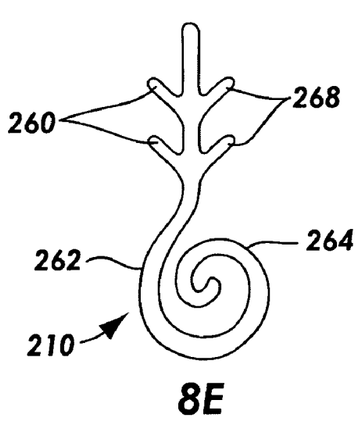
Figure 8F:
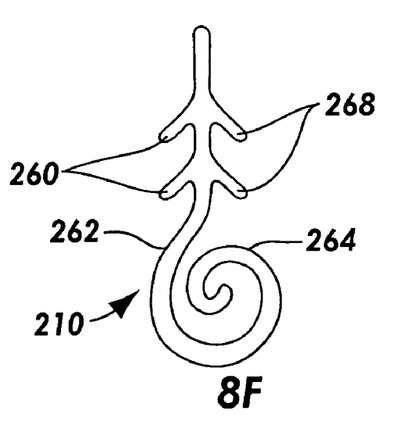
Figure 8G:
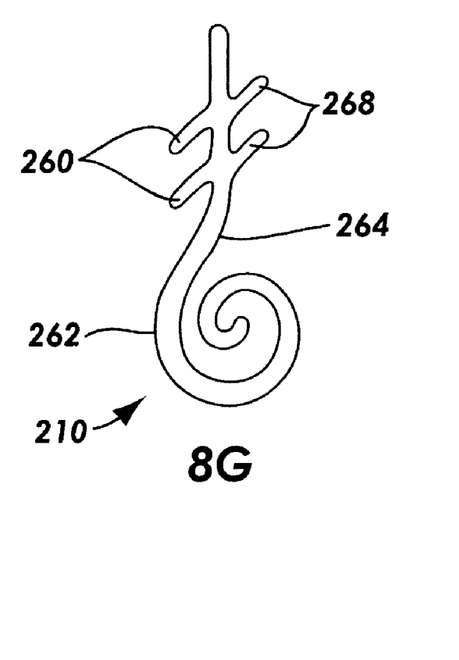
Figure 8H:
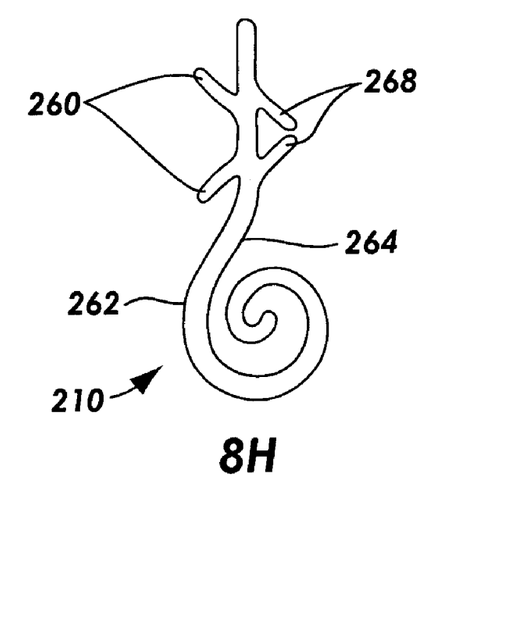
Figure 8I:
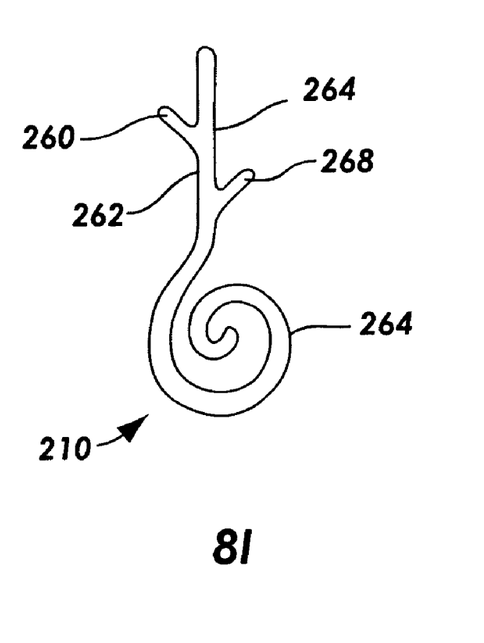
Figure 8J:
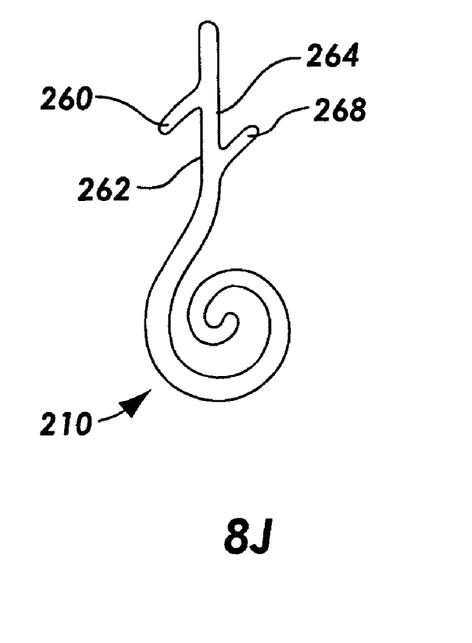

FIG. 7 is a cross-sectional view illustrating the way in which the curtain 110 inflates during a crash or accident. More specifically, when a crash or accident occurs, the inflator 14 (shown in FIG. 1) inflates the curtain 110 by producing and/or channeling a volume of inflation gas 172 into the curtain 110. In turn, this inflation of the curtain 110 pushes and/or moves the headliner 132 away from the trim panel 134 such that the inflating curtain 110 may descend and cover all or a portion of the side of the vehicle interior 112.

As the curtain 110 inflates, the inflation gas 172 fills the first pleat 160 (shown in FIG. 4) and opens the first pleat 160 (shown in FIG. 4) into at least one first bulge 174. Similarly, the inflation gas 172 also fills the second pleat 168 (shown in FIG. 4) such that the second pleat 168 opens into at least one second bulge 176. Preferably, pleats 160, 168 open into the bulges 174, 176 prior to or at the same time as the curtain 110 is completely filled with the inflation gas 172.

As can be seen in FIG. 7, previously known inflatable curtains have a deployment trajectory 182 (represented graphically by an arrow in phantom lines) that is set such that the deployment of these curtains will impact the trim panel 134 and/or other portions of the vehicle interior 112 when they are inflated and deployed. However, when the curtain 110 of the present invention is inflated and deployed, the first bulge 174 and the second bulge 176 interacts with the roof rail 118, the trim panel 134, and/or other portions of the vehicle interior 112. This interaction with the vehicle interior 112 changes the deployment trajectory 180 of the curtain 10. More specifically, this interaction with the vehicle interior 112 changes the deployment trajectory 180 of the curtain 110 such that the deploying curtain 110 will clear the trim panel 134.

Referring now to FIGS. 8A through 8J, cross-sectional views of further embodiments of the inflatable curtain of the present invention are illustrated. Specifically, FIGS. 8A through 8J shows multiple embodiments an inflatable curtain 210 according to the present invention that may be mounted on the vehicle interior 112 (shown in FIG. 7). As can be seen in FIGS. 8A through 8J, most of the compounds and the elements of the inflatable curtain 210 are similar and/or equivalent to the components and elements that are found in the embodiments described above.

As with the previous embodiments, the inflatable curtain 210 comprises a first panel 262 and a second panel 264. The second panel 264 is attached to the first panel 262. A first pleat 260 and a second pleat 268 have also been added. As seen in FIGS. 8E through 8H, more than one first pleat 260 and/or more than one second pleat 268 may also be used.

As can be seen in FIGS. 8A–8J, various embodiments of the inflatable curtain 210 may be constructed in which the orientation, configuration, and/or number of the first pleats 260 and/or the second pleats 268 may be constructed. For example, some embodiments, such as those illustrated in FIGS. 8A through 8D, may be made in which the first pleat 260 is aligned with the second pleat 268. Other embodiments, such as those illustrated in FIGS. 8I and 8J, may be made in which the first pleat 260 is offset from the second pleat 268. Still other embodiments, such as those illustrated in FIGS. 8D and 8H, may be made in which the first pleat 260 opens upwards and the second pleat 268 opens downwards. Additional embodiments, such as those shown in FIGS. 8B and 8G, may have the first pleat 260 open downwards and the second pleat 268 open upwards. Further embodiment, such as those shown in FIGS. 8C, 8E, and 8I, may have both the first pleat 260 and the second pleat 268 open upwards. Even further embodiments, such as those shown in FIGS. 8A and 8F, may have both the first pleat 260 and the second pleat 268 open downwards.

Referring now to FIGS. 1–8J generally, the present invention also provides an easy and efficient method for changing the deployment trajectory of an inflatable curtain. First, an inflatable curtain 10, 110, 210 is obtained. Next, at least one first pleat 60, 160, 260 is added to the first panel 62, 162, 262. Preferably, the first pleat 60, 160, 260 is added such that when the inflatable curtain 10, 110, 210 inflates, the first pleat 60, 160, 260 opens into at least one first bulge 74, 274, 274 that changes the deployment trajectory 80, 180 of the inflatable curtain 10, 110, 210.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflatable curtain comprising:
    a first panel having at least one first pleat formed by doubling a portion of the material of the first panel back upon itself twice such that there are two folds in the material of the first panel, the first pleat constructed such that when the inflatable curtain is inflated with inflation gas, the first pleat opens into at least one first bulge that changes the deployment trajectory of the inflatable curtain; and
    a second panel that is attached to the first panel, wherein the inflatable curtain is designed to be positioned along a vehicle roof rail.

2. An inflatable curtain as in claim 1 wherein the first bulge is designed to interact with a portion of a vehicle interior.

3. An inflatable curtain as in claim 1 wherein the first pleat opens into the first bulge prior to the curtain being completely filled with the inflation gas.

4. An inflatable curtain as in claim 1 wherein the first bulge is designed such that the deploying inflatable curtain will clear a trim panel on a vehicle interior.

5. An inflatable curtain as in claim 1 wherein the first panel is attached to the second panel via sewing.

6. An inflatable curtain as in claim 1 wherein the first panel is attached to the second panel via adhesive bonding.

7. An inflatable curtain as in claim 1 wherein the first pleat opens downwards when the inflatable curtain is installed onto a vehicle interior.

8. An inflatable curtain as in claim 1 wherein the first pleat opens upwards when the inflatable curtain is installed onto a vehicle interior.

9. An inflatable curtain as in claim 1 wherein the first pleat spans the length of the first panel.

10. An inflatable curtain as in claim 1 further comprising at least one second pleat added to the second panel, the second pleat constructed such that when the inflatable curtain inflates, the second pleat opens into at least one second bulge.

11. An inflatable curtain as in claim 10 wherein the second bulge changes the deployment trajectory of the inflatable curtain.

12. An inflatable curtain as in claim 10 wherein the second pleat is formed by folding the second panel.

13. An inflatable curtain as in claim 1 wherein the first pleat spans a portion of the length of the first panel.

14. An inflatable curtain comprising:
    a first panel;
    a second panel that is attached to the first panel; and
    at least one first pleat added to the first panel and formed by doubling a portion of the material of the first panel back upon itself twice such that there are two folds in the material of the first panel, and at least one second pleat added to the second panel and formed by doubling a portion of the material of the second panel back upon itself twice such that there are two folds in the material of the second panel, the first pleat and the second pleat constructed such that when the inflatable curtain is inflated with inflation gas, the first pleat opens into at least one first bulge and the second pleat opens into at least one second bulge, the first pleat and the second pleat positioned such that the first bulge and the second bulge change the deployment trajectory of the inflatable curtain, wherein the inflatable curtain is designed to be positioned along a vehicle roof rail.

15. An inflatable curtain as in claim 14 wherein the first bulge and the second bulge are designed to interact with a portion of a vehicle interior.

16. An inflatable airbag as in claim 15 wherein the first pleat spans the length of the first panel and the second pleat spans the length of the second panel.

17. An inflatable airbag as in claim 15 wherein the first pleat spans a portion of the length of the first panel and the second pleat spans a portion of the length of the second panel.

18. An inflatable airbag as in claim 15 wherein the first pleat spans a portion of the length of the first panel.

19. An inflatable curtain as in claim 15 wherein the second pleat spans a portion of the length of the second panel.

20. An inflatable curtain as in claim 14 wherein the first pleat and the second pleat open into the first bulge and the second bulge prior to the curtain being completely filled with the inflation gas.

21. An inflatable curtain as in claim 14 wherein the first bulge is designed such that the deploying inflatable curtain will clear a trim panel on a vehicle interior.

22. An inflatable curtain as in claim 14 wherein the first panel is attached to the second panel via sewing.

23. An inflatable curtain as in claim 14 wherein the first panel is attached to the second panel via adhesive bonding.

24. An inflatable curtain as in claim 14 wherein the first pleat opens upwards and the second pleat opens downwards when the inflatable curtain is installed onto a vehicle interior.

25. An inflatable curtain as in claim 14 wherein the first pleat opens downwards and the second pleat opens upwards when the inflatable curtain is installed onto a vehicle interior.

26. An inflatable curtain as in claim 14 wherein the first pleat is aligned with the second pleat.

27. An inflatable curtain as in claim 14 wherein the first pleat is offset from the second pleat.

28. A method for changing the deployment trajectory of an inflatable curtain comprising:
    obtaining an inflatable curtain comprising a first panel and a second panel, the second panel being attached to the first panel, wherein the inflatable curtain is designed to be positioned along a vehicle roof rail; and
    adding at least one first pleat to the first panels, the first pleat formed by doubling a portion of the material of the first panel back upon itself twice such that there are two folds in the material of the first panel, the first pleat constructed such that when the inflatable curtain inflates, the first pleat opens into at least one first bulge that changes the deployment trajectory of the inflatable curtain.

29. A method as in claim 28 wherein the first bulge is designed to interact with a portion of a vehicle interior.

30. A method as in claim 28 wherein the first pleat opens into the first bulge prior to the curtain being completely inflated.

31. A method as in claim 28 wherein the first bulge is designed such that the deploying inflatable curtain will clear a trim panel on a vehicle interior.

32. A method as in claim 28 wherein the inflatable curtain further comprises at least one second pleat added to the second panel the second pleat formed by arranging the second panel such that only a portion of the material of the second panel is doubled back upon itself, the second pleat constructed such that when the inflatable curtain inflates, the second pleat opens into at least one second bulge.

33. A method as in claim 32 wherein the second bulge changes the deployment trajectory of the inflatable curtain.

* * * * *